United States Patent [19]
Mosshart et al.

[11] 3,736,032
[45] May 29, 1973

[54] PNEUMATIC DRIVE SPROCKET FOR TRACKED VEHICLES

[75] Inventors: Crockett Mosshart, Detroit; Earl F. Burton, Dearborn Heights; Walter C. Macklem, Detroit, all of Mich.

[73] Assignee: Uniroyal, Inc., New York, N.Y.

[22] Filed: Jan. 28, 1970

[21] Appl. No.: 6,531

[52] U.S. Cl. ............... 305/34, 305/35 EB, 74/243 R, 152/357
[51] Int. Cl. ............................................. B62d 55/12
[58] Field of Search ..................... 305/34, 35 EB, 57; 152/357; 74/243 R, 244, 230.7

[56] References Cited
UNITED STATES PATENTS

| | | | |
|---|---|---|---|
| 3,074,455 | 1/1963 | Richey | 152/356 |
| 3,107,128 | 10/1963 | Ruane | 305/35 EB |
| 3,355,224 | 11/1967 | Skanes | 305/57 X |
| 3,105,536 | 10/1963 | Cappa | 74/230.7 X |
| 3,601,212 | 8/1971 | Peterson | 305/19 |
| 3,606,921 | 9/1971 | Grawey | 152/354 |
| 3,612,624 | 10/1971 | Stedman | 305/19 |

Primary Examiner—Richard J. Johnson
Attorney—Norbert P. Holler

[57] ABSTRACT

A pneumatic drive sprocket for tracked vehicles which includes a belted radial tire casing having radially projecting lugs or teeth disposed in spaced-apart relationship about the circumference of the tire and which are adapted to engage the track for driving purposes. The utilization of such a drive sprocket enables the vehicle to obtain the shock absorbing and flotation characteristics of pneumatic tires while permitting accurate, consistent and positive driving engagement with the track due to the fact that the pitch length between the teeth is not appreciably changed upon contact with the ground because of the essentially circumferentially inextensible nature of the radial belted tire.

2 Claims, 6 Drawing Figures

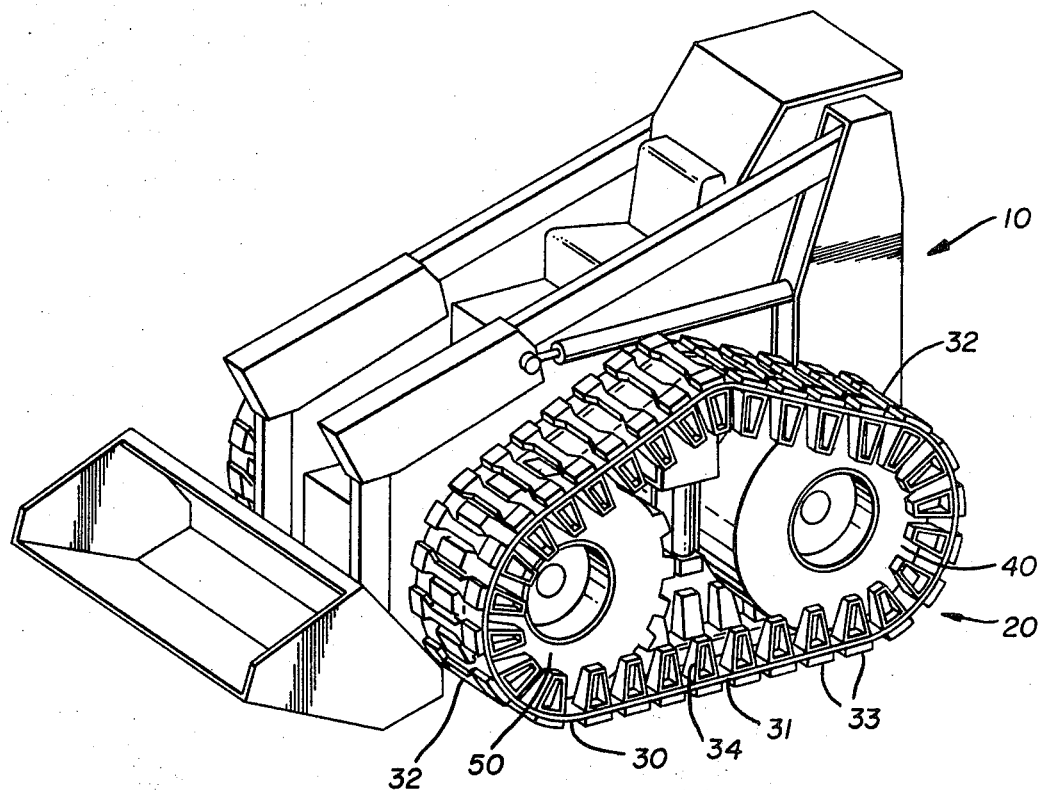
FIG. 1
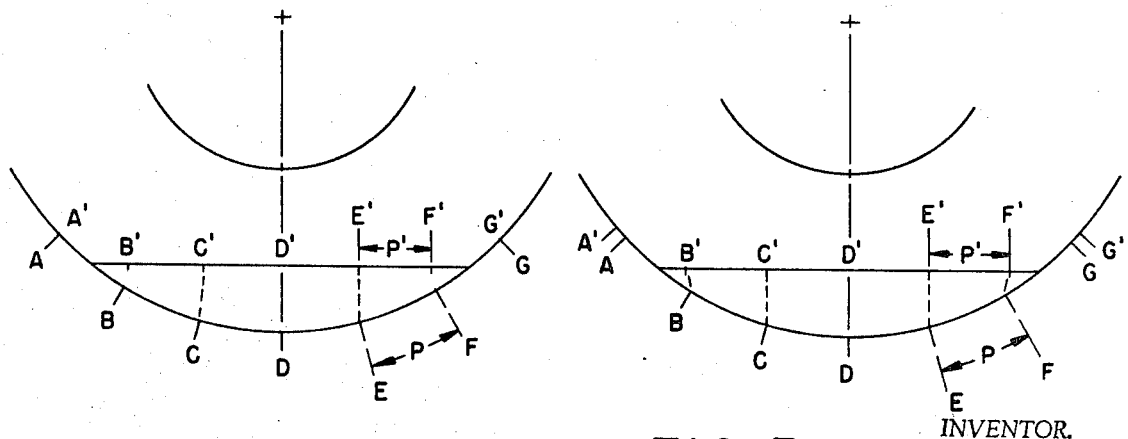
FIG. 2
FIG. 3
INVENTOR.
CROCKETT MOSSHART
ATTORNEYS

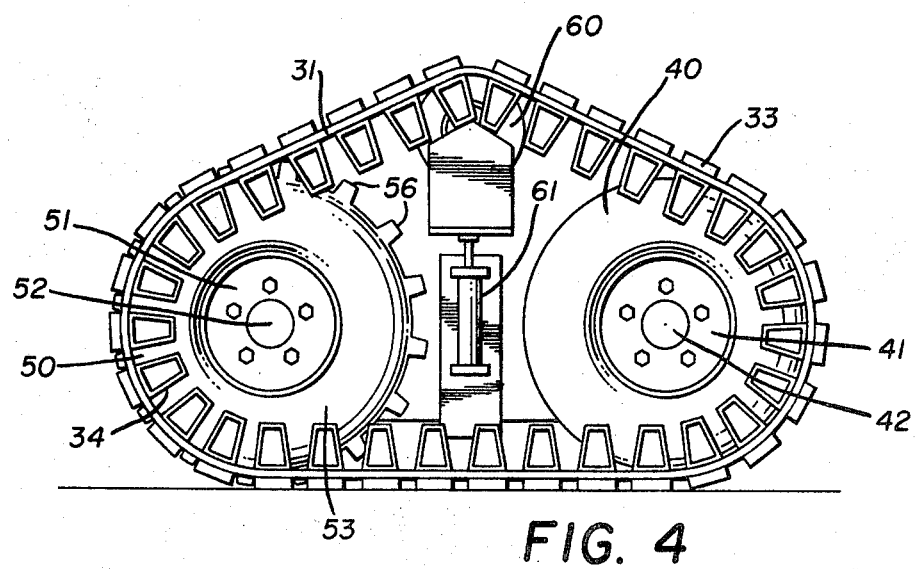
FIG. 4
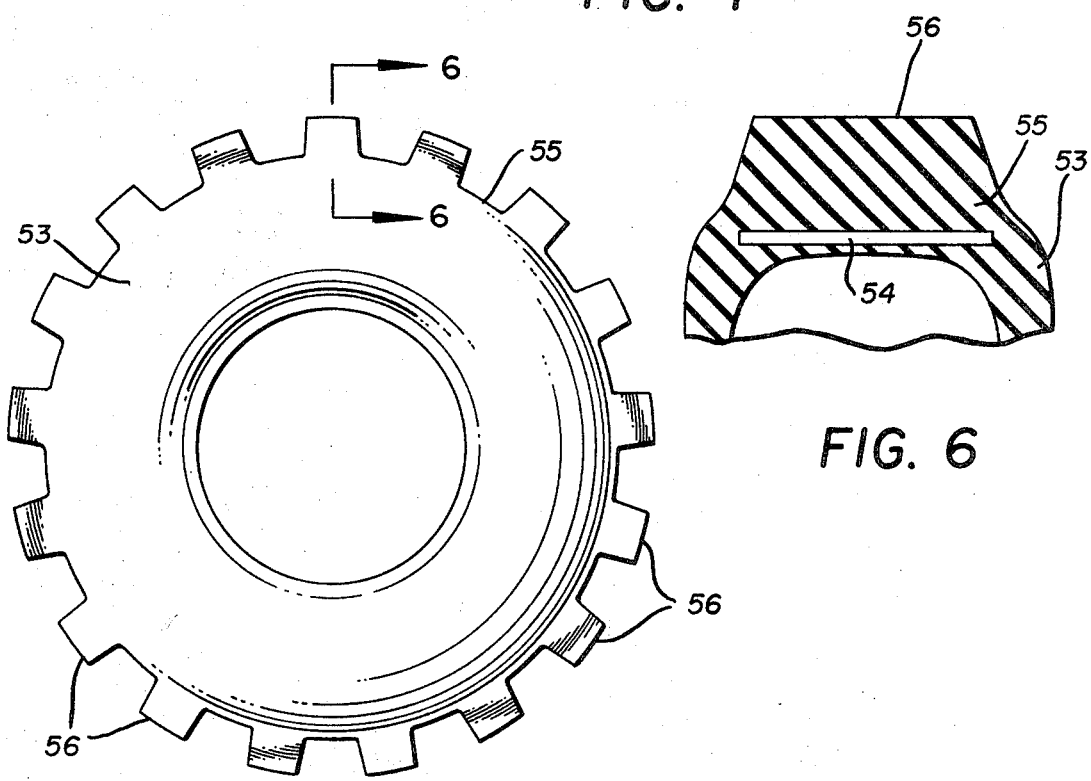
FIG. 5
FIG. 6
INVENTOR.
CROCKETT MOSSHART
BY
ATTORNEYS

PNEUMATIC DRIVE SPROCKET FOR TRACKED VEHICLES

FIELD OF INVENTION

This invention in general relates to track laying vehicles which are employed in a variety of environments, one example being earth-moving equipment adapted to off-the-road use. The invention in particular relates to an improved drive sprocket for use with the tracks of such vehicles.

DESCRIPTION OF THE PRIOR ART

The following prior art is known to applicants:
Christmas U.S. Pat. No. 2,149,278; Deardorff U.S. Pat. No. 2,179,587; 2,179,587; U.S. Pat. No. 2,515,128; Koenig U.S. Pat. No. 2,745,460; Cappa U.S. Pat. No. 3,105,536; Maradyn U.S. Pat. No. 3,116,956.

The above listed prior art shows a variety of endless tracks or treads and also a variety of drive means therefor. This art generally can be divided into three catagories with regard to the drive means employed. First, some of these references show conventional metal sprockets. Second, some show pneumatic tires which engage the track strictly on a frictional basis. Third, some of them also show solid tires having lugs spaced about their periphery.

All of these systems are subject to some objections or disadvantages.

Thus, the first and third categories referred to above, while providing a relatively consistent and secure engagement between the sprocket and the track, also give a relatively hard ride. The second category listed above does provide some shock absorbing characteristics but is obviously not capable of providing a positive drive or connection between the driving means and track.

Applicants are also aware of the fact that it is possible to overcome the objections of the first and third types referred to above by providing a sophisticated suspension system including torsion bars as is often done on military vehicles. This approach however has the definite disadvantage of being very expensive.

Attempts have also been made to overcome the deficiencies of the second class of drive means by providing circumferentially spaced lugs on an ordinary pneumatic tire. However, in the ordinary bias type tire the length of the tread elements in the contact area varies, causing a mismatch between the lugs and the track and leading to throwing off the track.

SUMMARY OF THE INVENTION

It has been discovered that the above-noted disadvantages can be overcome by incorporating a circumferential tread, molded as an integral part of an essentially non-extensible belted radial ply tire casing and by providing radially projecting cross-lugs or teeth at spaced intervals about the circumference of the tread.

Due to the fact that there is no appreciable change in the length of the tread elements of a belted radial tire at its point of contact the pitch distance between the teeth remains essentially constant and therefore assures continuous and consistent engagement between the teeth and track.

Therefore by utilizing a drive sprocket of the type described it is possible to obtain the advantages of a pneumatic tire, which primarily are improved shock absorbing characteristics, with the advantages of the metal sprocket, which are primarily a consistent spacing between the teeth and thereby a consistent engagement with the track.

Accordingly, production of an improved pneumatic drive sprocket of the character described becomes the principal object of this invention with other objects thereof becoming more apparent upon a reading of the following brief specification considered in view of the accompanying drawings.

Of the Drawings:

FIG. 1 is a perspective view of the improved drive sprocket mounted on a track laying vehicle.

FIG. 2 is a schematic view of a bias type tire showing the effect of contact on the tread elements.

FIG. 3 is a schematic view of a belted radial tire showing the effect of contact on the tread elements.

FIG. 4 is a side elevational view of the improved sprocket mounted in conjunction with the track.

FIG. 5 is a side elevation of the improved sprocket itself.

FIG. 6 is a sectional view taken along the lines 6—6 of FIG. 5.

DESCRIPTION OF THE PREFERRED EMBODIMENT

Turning first to FIG. 1 in which the improved sprocket is shown, it will be noted that the belt or track assembly 20 as shown is mounted on a conventional vehicle 10. It will be assumed, of course, that an identical track structure is mounted on each side of the vehicle and only one side will be described herein In this regard overall track assembly 20 includes the track itself 30, an idler wheel 40, the drive sprocket 50, and a tension wheel 60 (See FIG. 4).

Considering next, then, FIGS. 1 and 4 for a detailed description of the track 30, it will be seen that the same includes a pair of opposed endless track bands 31,31. Mounted on these bands and spanning the distance between them is a series of grouser bars 32,32 which are mounted thereon in conventional fashion. These grouser bars are shown as being provided with track pads or shoes 33,33 and again the mounting of these is well known. Finally, the track includes a series of guide plates 34,34 mounted on each of the bars 32,32 and projecting inwardly so as to resist lateral displacement of the track with regard to the sprocket 50 and the idler wheel 40.

Referring again then to FIG. 4 it will be seen that idler wheel 40 is mounted adjacent the rear end of the vehicle 10 with this wheel including a pneumatic tire mounted on a wheel 41 which in turn is journalled on axle 42. The function of the idler wheel is believed to be well known in this art.

Also, and because in the form of the invention shown both a sprocket 50 and the idler wheel 40 are rigidly mounted, a tension wheel 60 is employed and is activated by hydraulic cylinder 61 to maintain the desired track tension. An example of such a mounting can also be seen in Maradyn U.S. Pat. No. 3,116,956 referred to above.

Although the above describes and shows the use of the pneumatic sprocket with a band track, it is within the scope of the invention to use the sprocket with other types of tracks such as single pin, double pin, or any others of proper design that are known in the art.

Turning next then to the sprocket 50 per se, as shown in FIGS. 5 and 6, it will be seen that the same consists of a belted radial tire casing mounted on a wheel 51 which is in turn mounted on axle 52 with it being understood that the axle is driven in conventional fashion.

The sprocket 50 also includes a radial ply carcass 53 fabricated in the usual manner known in the art with at least one breaker 54 constructed of any suitable inextensible material, preferably steel cables, surrounding the circumference of the toroidally shaped carcass. In conjunction with the usual rubber sidewalls, and integrally molded with them, is a circumferential tread 55 having a series of rubber teeth 56,56 which project radially of the tire and are spaced from each other about its circumference. These teeth are intended to engage the track by projecting between the grouser bars 32,32 as clearly shown in FIG. 1.

Considering next then FIGS. 2 and 3 it should be noted that FIG. 2 shows a conventional bias type tire with a series of tread elements A, B, C, etc. The pitch distance between adjacent points would normally be P while upon contact there is a deflection of that type tire so that the distance P becomes reduced to the distance P'. It would be apparent that assuming there were teeth such as 56 mounted on a tire of this type that there would then be a mismatch between the teeth and the spaces between the grouser bars 32,32 thereby causing the track to be thrown.

FIG. 3 is similar to FIG. 2 but illustrates a radial belted tire and it will be seen that upon contact the pitch distance P does not change so that P' remains substantially the same. Therefore the teeth would remain the same distance apart and thus continued positive engagement with the track is assured.

It will be seen therefore that by providing a belted radial tire casing with a plurality of radially projecting teeth that a new and improved drive sprocket for track laying vehicles has been developed.

While a full and complete description of the invention has been set forth in accordance with the dictates of the Patent Statutes, it should be understood that modifications thereof can be resorted to without departing from the spirit hereof or the scope of the appended claims.

What is claimed is:

1. A pneumatic drive sprocket for use with a vehicle having an endless track including multiple sprocket openings, comprising;
   A. a pneumatic radial tire casing, and a circumferentially substantially non-extensible belt disposed in surrounding relationship to the crown region of said casing;
   B. a circumferential track-contacting member integrally secured to said belted radial pneumatic tire casing in surrounding superimposed relation to said belt; and
   C. a plurality of rubber teeth
      1. provided on said track-contacting member and extending transversely thereof along lines substantially parallel to the axis of rotation of the sprocket,
      2. projecting radially of said track-contacting member,
      3. spaced from each other circumferentially of said track-contacting member at a substantially constant pitch length, with the widths of the spaces between said teeth being at least approximately equal to the widths of said teeth, and
      4. adapted upon rotation of the sprocket to extend sequentially into the respective sprocket openings of the track for driving engagement with the track;
   D. the belted radial tire casing construction ensuring that, under normal operating conditions with a track running over the sprocket, the pitch distance between said teeth remains substantially constant throughout the circumference of the sprocket, and throwing off the track is avoided.

2. A drive system for a tracked vehicle having a driven axle, comprising;
   A. a plurality of wheels each mounted on said axle for rotation therewith;
   B. an equal number of pneumatic drive sprockets each mounted on a respective one of said wheels and each including
      1. a pneumatic radial tire casing mounted on said respective wheel, and a circumferentially substantially non-extensible belt disposed in surrounding relationship to the crown region of said casing,
      2. a circumferential track-contacting member integrally secured to said belted radial pneumatic tire casing in surrounding superimposed relationship to said belt,
      3. a plurality of rubber teeth
         a. provided on said track-contacting member and extending transversely thereof along lines substantially parallel to the axis of rotation of the sprocket,
         b. projecting radially of said track-contacting member,
         c. spaced from each other circumferentially of said track-contacting member at a substantially constant pitch length, with the widths of the spaces between said teeth being at least approximately equal to the widths of said teeth; and
   C. an equal number of endless tracks each including multiple sprocket openings and running over a respective one of said track-contacting members;
   D. said teeth of each sprocket being adapted, upon rotation of that sprocket, to extend sequentially into the respective sprocket openings of the associated track for driving engagement with the latter; and
   E. the belted radial tire construction insuring that, under normal operating conditions, the pitch distance between said teeth of each sprocket remains substantially constant throughout the circumference of the sprocket, and throwing off of the associated track is avoided.

* * * * *